United States Patent [19]

Milch et al.

[11] 3,748,549

[45] July 24, 1973

[54] RESISTIVE SEA FOR CAMERA TUBE EMPLOYING SILICON TARGET WITH ARRAY OF DIODES

[75] Inventors: Alfred Milch, Teaneck, N.J.; Barry Singer, New York, N.Y.

[73] Assignee: North American Philips Corporation, New York, N.Y.

[22] Filed: Mar. 29, 1972

[21] Appl. No.: 239,208

[52] U.S. Cl. 317/235 NA, 317/235 N, 317/235 AM, 317/235 AU

[51] Int. Cl. .............................................. H01l 17/00

[58] Field of Search .............................. 317/235 NA

[56] References Cited

UNITED STATES PATENTS

| | | | |
|---|---|---|---|
| 3,419,746 | 12/1968 | Crowell et al. | 315/10 |
| 3,564,309 | 2/1971 | Hoeberechts et al. | 313/66 |
| 3,633,077 | 1/1972 | Tsuji | 317/235 |
| 3,654,476 | 4/1972 | Hakki | 250/211 |
| 3,668,473 | 6/1972 | Miyashiro | 317/234 |

OTHER PUBLICATIONS

R. Mansfield, "The Electrical Properties of Bismuth Oxide," Proc. Phys. Soc. (London), vol. 62B, p. 478–479, 1949.

E. Friederich, "Some Previously Unknown Properties...Solid States," Z. Physik, vol. 31, p. 813–827, 1925.

L. H. Von Ohlsen, "Soft X-ray Effects Upon Silicon-Diode Arrays Aged in Camera Tubes," IEEE J. of S.S. Circuits, SC-5 No. 5, Oct. 1970, p. 261–265.

Handbook of Chem. and Physics, 44th Edit., Chem. Rubber Pub. Co., 1963, p. 2665, 2769.

*Primary Examiner*—John W. Huckert
*Assistant Examiner*—Joseph E. Clawson, Jr.
*Attorney*—Frank R. Trifari

[57] ABSTRACT

A camera tube employing a silicon target with a diode array which is covered with a resistive layer or sea on the side facing the electron beam. The resistive sea Aconsists of a layer of bismuth oxide which protects the silicon target from damage by x-rays while minimizing charge build-up on the insulating layer between diodes which would otherwise prevent beam landing. The resistive sea is covered by a very thin layer of cadmium telluride which stabilizes the $Bi_2O_3$ layer and improves its beam acceptance properties.

1 Claim, 2 Drawing Figures

PATENTED JUL 24 1973 3,748,549

RESISTIVE SEA FOR CAMERA TUBE EMPLOYING SILICON TARGET WITH ARRAY OF DIODES

The invention relates to a camera tube employing a semi-conductor wafer having a diode array which is covered with a resistive layer on the side scanned by an electron beam.

A camera tube employing a silicon diode array has been described in U.S. Pat. No. 3,011,089. A silicon wafer of one conductivity type is provided with islands of the opposite conductivity type providing an array of *p-n* junctions or diodes. A light image is formed on a surface of the wafer opposite the islands; this is called the image side of the wafer. The other surface contains the islands of opposite conductivity type and is scanned by an electron beam; this is called the beam side of the wafer. The electron beam, the diameter of which is larger than that of a single island, periodically charges the *p*-type islands down to cathode (ground) potential while the potential of the image side is held at suitable positive voltage. This potential difference can be sustained for a normal television frame time so long as the dark current is not high enough to discharge the diodes during this time. In order to isolate the *n*-type substrate from the beam, a thin layer of silicon dioxide ($SiO_2$), an insulator, covers the wafer on the side facing the electron beam, except for the islands of opposite conductivity type as described in U.S. Pat. No. 3,403,284.

The incident light associated with the image is absorbed in the silicon wafer, creating hole-electron pairs. Since the absorption coefficient for silicon for visible light is greater than 3,000$cm^{-1}$, most of the hole-electron pairs will be generated near the image surface while longer wave-lengths are absorbed throughout the layer; the minority carriers (holes) then diffuse to the depletion region of the diodes, discharging the diodes by an amount proportional to the light intensity. The recharging of the diodes by the scanning beam creates the video signal.

Since $SiO_2$ is an insulator, it is also charged to slightly below cathode potential by the high energy component of the scanning electron beam. In the absence of any mechanism for removing this charge, subsequent beam landing will be prevented and information readout thereby frustrated. Consequently, the $SiO_2$ layer is covered by an extremely thin layer of resistive material such as hafnium-tantalum nitride, antimony tri-sulfide or others referred to as a resistive sea, which conducts the charge away to the neighboring diodes.

Electrons striking the mesh at the end of the drift tube generate x-rays which may damage the target. Conventional resistive sea materials heretofor employed in layers sufficiently thin to permit the electron beam to penetrate to the underlying target structure either did not have sufficient x-ray absorptive power to prevent damage to the target, or materials which have sufficient absorptive power generally have other properties unsatisfactory for the purpose.

Bismuth oxide has been disclosed in application Ser. No. 222,632, filed Feb. 1, 1972 as a material suitable for a resistive sea because it has sufficient resistivity and x-ray absorptive power in a thickness which allows electrons to penetrate.

However, it has been found some degradation of resolution and loss of signal handling capability can occur if bismuth oxide alone is used as the resistive sea. While the cause of this instability is not known, it can be entirely avoided by providing a further layer of a resistive sea material having a resistivity of about $10^9$ ohm-cm and of the same order of thickness as that of the bismuth so that the electron beam can penetrate and reach the diodes, but one which does not have the x-ray absorptive power of bismuth oxide. Among those which may be used are cadmium telluride, antimony tri-sulfide, hafnium-tantalum nitride, and others. Cadmium telluride is the preferred substance for improving the signal handling capability and increasing resolution.

The invention will be described with reference to the accompanying drawings in which.

Figure 1:
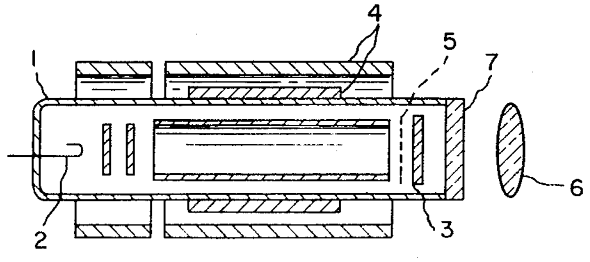
FIG. 1 is a schematic illustration of a television camera tube in accordance with one embodiment of the invention.

FIG. 1 shows a television camera tube 1 comprising a cathode 2 for forming and projecting an electron beam toward a target structure 3. Coils 4 deflect the electron beam in a known manner so that it scans a target surface on the target structure 3 in a line and frame sequence. Secondary electrons from the target surface are collected by the mesh electrode grid 5. A lens 6 projects incoming light through a transparent face plate 7 and images it on a light admitting surface of the target structure 3.

Figure 2:
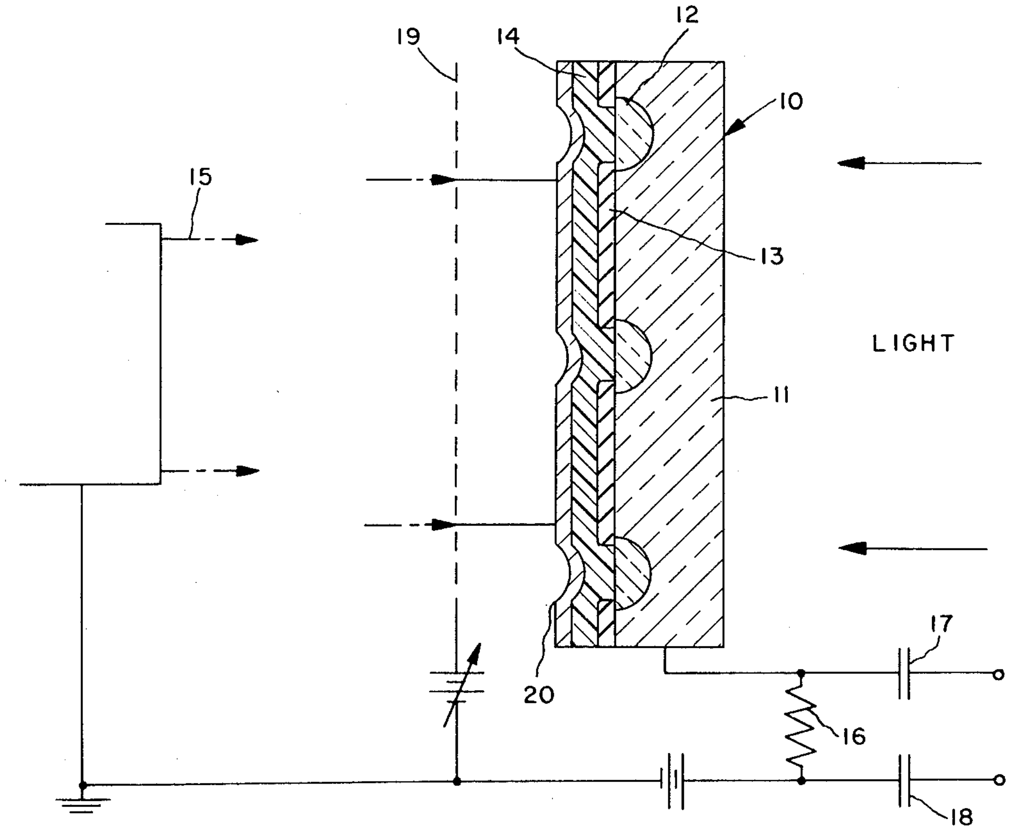
FIG. 2 is an enlarged view of part of the apparatus of FIG. 1.

Referring to FIG. 2, the target 10 includes a monocrystalline silicon wafer 11, illustratively *n*-type, into which a regular array of *p*-type regions 12 have been formed by diffusion of appropriate impurities through apertures in a silicon dioxide insulating layer 13. Each of the *p*-type regions forms with respect to the *n*-type substrate a reversed-biassed *p-n* junction diode under normal operating conditions, the capacity of which serves as a storage element.

Over the entire electron beam surface of the target there is deposited a resistive layer 14 of bismuth oxide over which in accordance with the present invention, a layer of cadmium telluride CdTe 20 is provided.

An electron beam 15 periodically charges the *p*-type regions down to cathode (ground) potential while incident light is absorbed in the wafer creating hole-electron pairs. The holes diffuse to the depletion region of the diodes, discharging the diodes by an amount proportional to the light intensity. Recharging of the diodes by the electron beam produces a current pulse which appears as a signal voltage across load resistor 16 which is coupled to an amplifying circuit by capacitors 17 and 18. A mesh type accelerating electrode 19 is provided in front of the target on the electron beam side. It is maintained at a potential such that electrons striking the mesh generate x-rays, a certain portion of which are intercepted by the target.

The bismuth oxide ($Bi_2O_3$) layer 14 was deposited by reactive evaporation of metallic bismuth. During this process, the silicon imaging wafer is heated in vacuum in the presence of a precisely monitored oxygen leak and is exposed to bismuth metal vapor being evaporated from a tantalum boat. Films grown according to this method appear dense, uniform, and have, when deposited on glass or other suitable transparent substrate, a bright lemon yellow color characteristic of the oxide, $Bi_2O_3$. Coating densities of up to 700 micrograms per square centimeter (about 8,500A thick assuming the $Bi_2O_3$ films were of density 8.5 gms/$cm^3$) were achieved with no difficulty.

The CdTe overlayer is deposited by vacuum deposition. The $Bi_2O_3$ covered silicon imaging wafers are exposed to a pure CdTe evaporant stream from a tantalum boat in the presence of a $2 \times 10^{-5}$ mm pressure oxygen leak. Optimum results were obtained by evaporating the CdTe at a rate of 2 ½A/sec. to a thickness of approximately 1,500A.

What is claimed is:

1. A target structure for receiving and storing a light image and adapted to be scanned by an electron beam to produce an electrical signal corresponding to variations in the light image comprising a wafer of semiconductive material having adjacent one surface thereof which is scanned by the electron beam an array of discrete rectifying barriers surrounded by regions free of rectifying barriers, insulating means coating said surface selectively at portions overlying regions free of rectifying barriers and leaving exposed portions overlying the rectifying barriers, an x-ray protective layer of bismuth sesquioxide($Bi_2O_3$) and a layer of cadmium telluride thereover each having a thickness permitting the electron beam to penetrate and impinge upon the rectifying barriers, each of said layers having a resistivity of about $10^9$ ohm-cm whereby charges are conducted away to neighboring diodes when the beam impinges on a given diode.

* * * * *